UNITED STATES PATENT OFFICE.

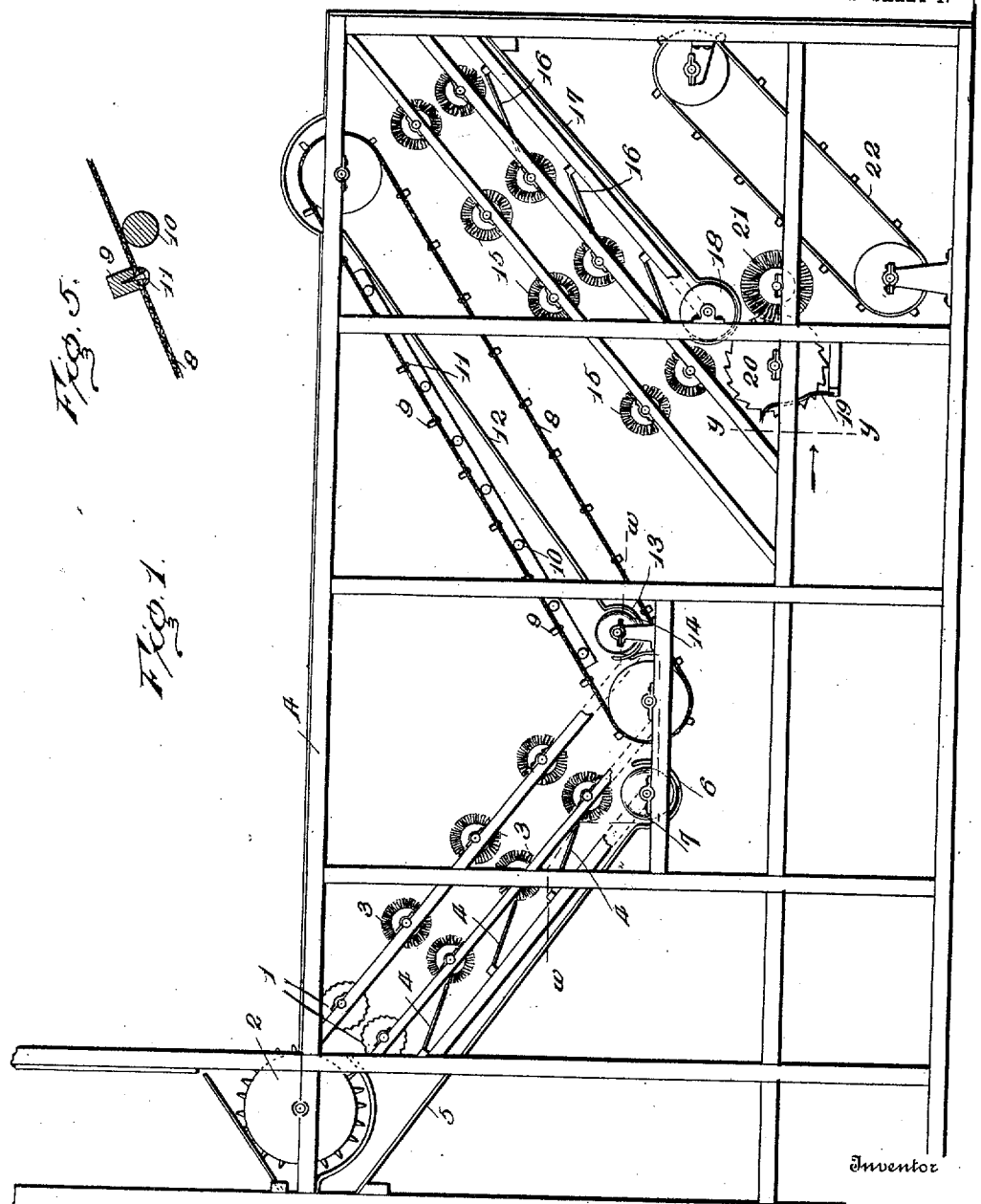

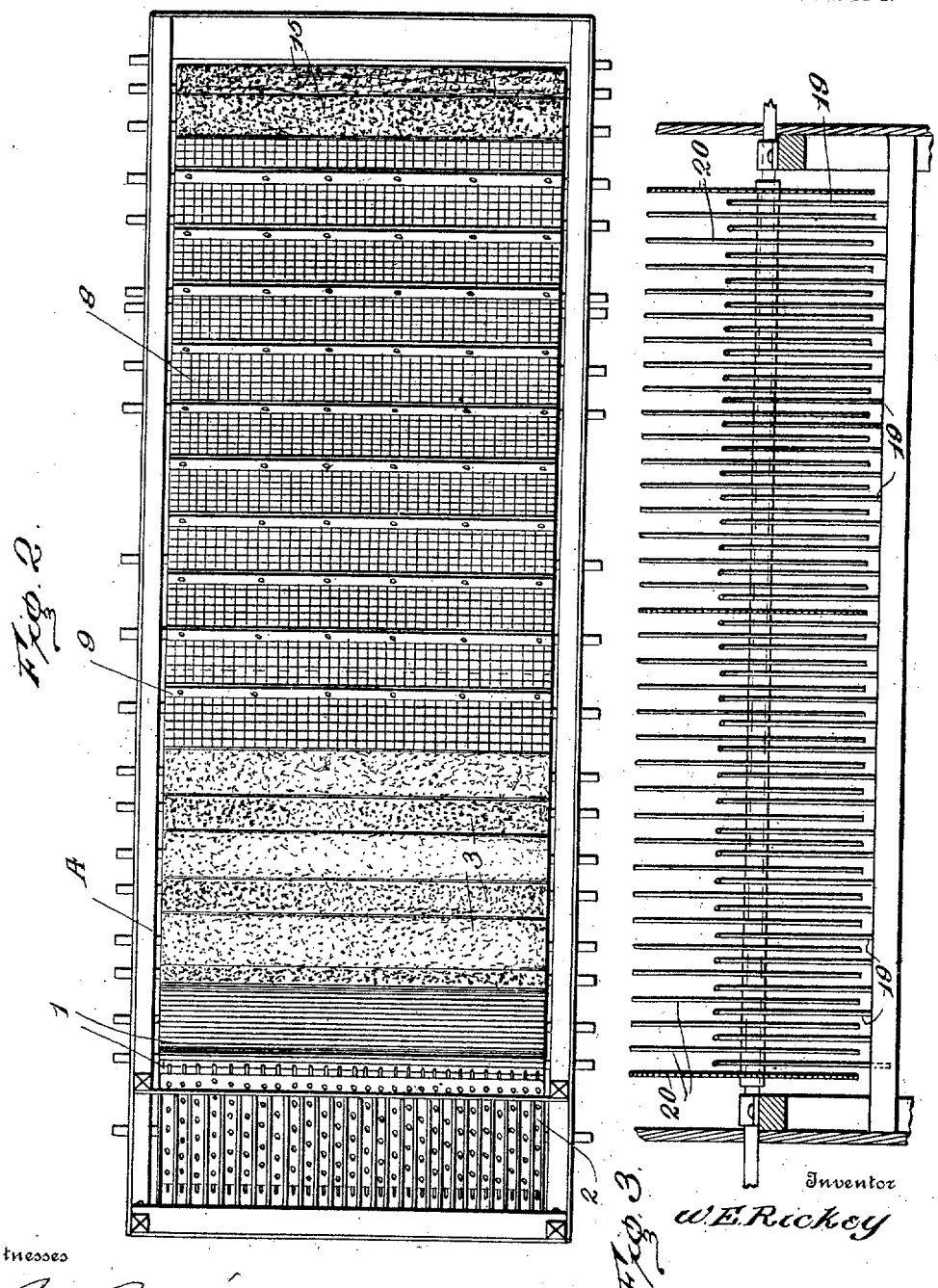

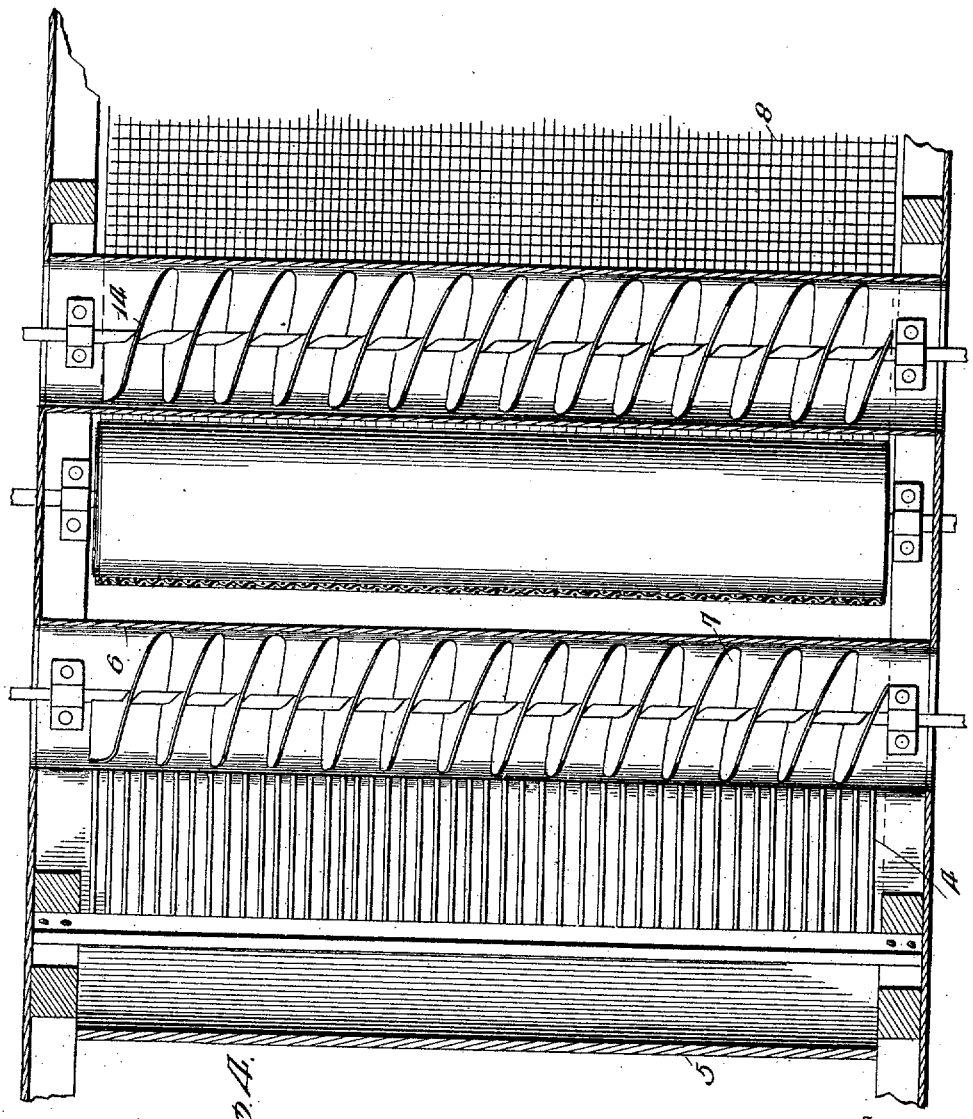

WILLIAM E. RICKEY, OF ROCKY, OKLAHOMA.

COTTON-SEPARATOR.

No. 886,249.     Specification of Letters Patent.     Patented April 28, 1908.

Application filed July 17, 1907. Serial No. 384,241.

*To all whom it may concern:*

Be it known that I, WILLIAM E. RICKEY, citizen of the United States, residing at Rocky, in the county of Washita, Oklahoma, have invented certain new and useful Improvements in Cotton-Separators, of which the following is a specification.

This invention provides a novel mechanism for separating cotton from hulls and other foreign matter and delivering the same in marketable form free from particles, such as broken hulls, sticks and the like.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a vertical longitudinal section of a cotton separator embodying the invention. Fig. 2 is a top plan view thereof. Fig. 3 is a vertical transverse section of the cleaning mechanism on the line $y$—$y$ of Fig. 1, looking in the direction of the arrow, showing the parts on a larger scale. Fig. 4 is a horizontal section on the line $w$—$w$ of Fig. 1. Fig. 5 is a detail view of a portion of the elevator and a supporting roll therefor, showing a tappet.

Corresponding and like parts are referred to in the following description and indicated in all the views of the drawings by the same reference characters.

The working parts of the mechanism are supported upon a framework A, suitably designed for receiving the same and comprising vertical, longitudinal and transverse timbers connected together in any substantial way. A pair of crushing rolls 1 are located in juxtaposition to a feeder 2 and said rolls may be of any construction and are preferably corrugated to insure breaking up of the hulls as the bolls pass between them. The feeding mechanism comprises a toothed cylinder 2 arranged in the path of a chute or conveniently disposed so as to receive the cotton bolls. The cotton may be supplied to the feeder 2 in any manner and is delivered thereby to the crushing rolls 1. Pairs of separating or evening rolls 3 are located in a descending series and have an echelon arrangement so that the cotton delivered from one set of rolls will be received by the next pair of rolls in successive order. The separating and evening rolls 3 consist of revolving brushes.

Below and opposite the space formed between the pairs of rolls are arranged grates 4 which are inclined rearwardly and downwardly reckoning from the crushing rolls to the last of the series of separating rolls 3. A plate 5 is arranged below the series of grates 4 and the pairs of rolls 1 and 3 and acts as a deflector to catch hulls, trash and other foreign matter and deliver the same into a trough 6 in which operates a screw conveyer 7 by means of which such foreign matter is discharged laterally.

It is of the utmost importance that the rolls of each pair be driven at an equal rate of speed so that one roll of a pair will operate approximately three times as fast as the companion or coöperating roll. By this arrangement one roll of a set acts as a clearer for the other roll, the fast roll removing the cotton from the slow roll and vice versa. The grates 4 direct the cotton from one pair of rolls to the next in order and at the same time eliminates broken hulls, sticks or like foreign matter or trash from the cotton.

An elevator 8 receives the cotton from the lowermost set of rolls 3 and carries the same upward and rearward and delivers the partially cleaned cotton to another series of separating rolls. The elevator consists of an apron of wire or mesh fabric across which are placed a series of lags or straps 9 which engage with the cotton and effect positive movement thereof upon the ascending run or portion of the elevator. A series of rolls 10 support the upper portion of the elevator and are adapted to engage with projecting portions 11 upon the lower side of the upper run or portion of the elevator, and these projecting portions 11 constitute tappets which engage with the rolls 10 and effect a vibratory movement of the upper portion of the elevator so as to insure separation of small particles of foreign matter, such as broken hulls, sticks and the like, that may tend to adhere to the cotton. A plate 12 is arranged below the upper run or portion of the elevator and communicates at its lower end with a trough 13 in which a screw conveyer 14 is arranged to operate to effect positive discharge of the foreign matter received in the said trough.

The second set of separating and evening rolls 15 have an inclined arrangement in an opposite direction to the first set of separating rolls. The separating rolls 15 are provided in pairs, the rolls of each pair being driven at unequal speeds in any ratio found most convenient. The separating rolls 15, like the rolls 3, consist of brushes. Grates 16 are located below the pair of rolls and opposite to the spaces formed between them and are designed to catch the cotton and direct the same from one pair of rolls to the other, while at the same time serving to effect separation of foreign matter from the cotton. A plate 17 is arranged below the series of rolls 15 and terminates in a trough 18 in which is arranged a screw conveyer to effect lateral displacement of the foreign matter.

Cleaning saws are arranged to receive the cotton from the lowermost set of separating rolls 15, and comprises ribs 19 and a gang of saws 20. A brush 21 removes the cotton from the saws 20 and delivers the same to an elevator 22, which conveys the clean cotton to a suitable point of discharge.

Two sets or series of separating rolls are oppositely inclined, thereby admitting of the separator occupying a minimum amount of space and the cotton being fed automatically from one set of rolls to the other, the elevator 8 arranged intermediate of the two sets of separating rolls occupying a position over the second set of separating rolls and serving the two-fold office of raising the cotton from the discharge end of one series of separating rolls to the receiving end of the second set of separating rolls and also removing foreign matter during the transit of the cotton. The vibratory motion imparted to the elevator assists materially in loosening and freeing the foreign matter from the cotton as will be readily understood.

Having thus described the invention, what is claimed as new is:

1. In a cotton separator, the combination of a feeder, crushing rolls arranged to receive the cotton from said feeder, and a series of pairs of separating or evening rolls arranged with said crushing rolls in a declining series, and grates arranged below the spaces formed between adjacent pairs of rolls and inclined rearward and downward, and having their rear ends terminating close to the lowermost rolls of the respective pairs to insure delivery of the cotton from one pair of rolls to the other.

2. In a cotton separator, the combination of a pair of crushing rolls, a feeder for supplying cotton thereto, a series of pairs of separating rolls arranged with the crushing rolls in a declining series and spaced apart, the several rolls being of like diameter and driven at unequal rates of speed, whereby one roll of a pair acts as a clearer for the coöperating roll, rearwardly and downwardly inclining grates arranged below the spaces formed between adjacent pairs of rolls, a plate located below the feeder, grates and rolls and terminating at its lower end in a trough, and a screw conveyer arranged to operate in the said trough.

3. In a cotton separator, the combination of an endless apron of mesh or open work material, supporting means arranged beneath the upper run or portion of said apron, and tappets applied to the inner sides of said endless apron to coöperate with the aforesaid supporting means to impart a trembling or vibratory movement to the upper run of the apron in the operation of the machine.

In testimony whereof I affix my signature in presence of two witnesses.

WILLIAM E. RICKEY. [L. S.]

Witnesses:
GEORGE W. MILLER,
J. I. HARNESS.